United States Patent [19]

Koepff et al.

[11] Patent Number: 5,316,717
[45] Date of Patent: May 31, 1994

[54] PROCESS FOR MAKING GELATINE FILMS

[75] Inventors: Peter Koepff, Heidelberg; Klaus Bräumer, Eberbach; Helmuth Stahl, Michelstadt; Eberhard Dick, Beerfelden-Gammelsbach, all of Fed. Rep. of Germany

[73] Assignee: Deutsche Gelatine-Fabriken Stoess AG, Eberbach, Fed. Rep. of Germany

[21] Appl. No.: 679,081

[22] Filed: Aug. 26, 1991

Related U.S. Application Data

[63] Continuation of PCT/EP89/01574, Dec. 20, 1989.

[30] Foreign Application Priority Data

Dec. 24, 1988 [DE] Fed. Rep. of Germany ....... 3843844

[51] Int. Cl.⁵ .................. B29C 47/34; B29C 55/02
[52] U.S. Cl. .................. 264/564; 106/126; 106/131; 106/136; 106/137; 264/151; 264/209.5; 264/210.6; 264/211; 264/211.11; 264/211.12; 264/160; 264/175; 264/210.2; 425/327

[58] Field of Search .............. 264/211.11, 176.11, 264/564, 151, 160, 209.5, 210.6, 211, 175, 211.12, 210.2; 106/125–132, 134, 136, 137; 425/327

[56] References Cited

U.S. PATENT DOCUMENTS

| 3,067,468 | 12/1962 | Kelley et al. | 264/177.11 |
| 4,655,840 | 4/1987 | Wittwer et al. | 106/127 |
| 4,992,100 | 2/1991 | Koepff et al. | 106/125 |
| 5,154,864 | 10/1992 | Nishiyama et al. | 264/211.11 |

Primary Examiner—Jeffery Thurlow
Assistant Examiner—Mathieu Vergot
Attorney, Agent, or Firm—Shenier & O'Connor

[57] ABSTRACT

A process for making gelatine films, in particular sheet gelatine, from powdered gelatine includes the following steps: The powdered gelatine with the addition of water is plasticized by the application of shearing forces at an elevated pressure and an elevated temperature, the plasticized mass is pressed in the form of a film through a slotted die, the film is drawn off the slotted die under tension and the taut film is dried.

17 Claims, 1 Drawing Sheet

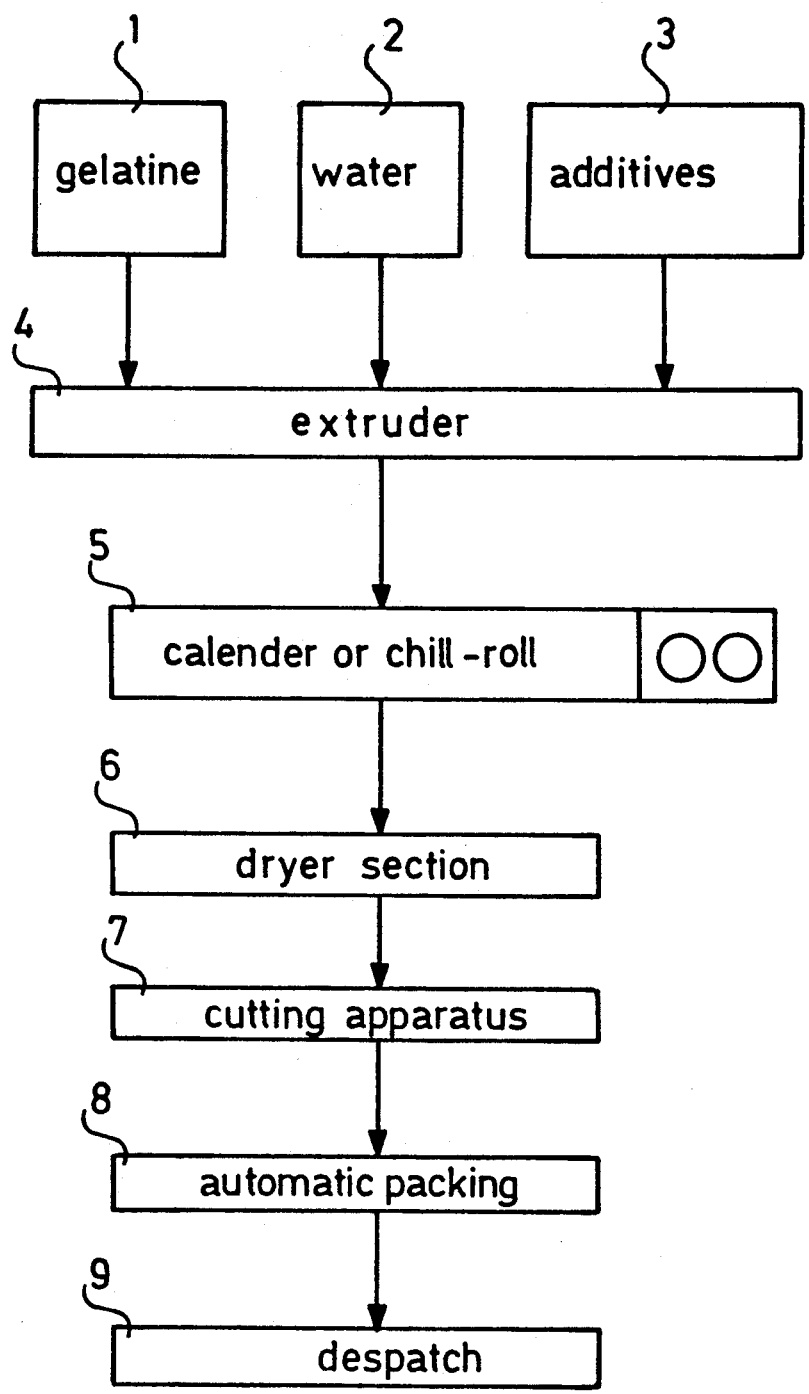

PROCESS FOR MAKING GELATINE FILMS

This application is a continuation of International Application PCT/EP 89/01574 filed Dec. 20, 1989.

FIELD OF THE INVENTION

The invention relates to a process for making gelatine films, in particular sheet gelatine, from powdered gelatine.

BACKGROUND OF THE INVENTION

As is generally known, sheet gelatine is widely used in the food sector, in particular in the home, in confectionary establishments, diet kitchens, food factories.

The known process for making film-like sheet gelatine requires a high degree of apparatus expenditure and is time-consuming and costly: Gelatine is put into hot water and stirred until it dissolves. A considerable amount of air is introduced into the solution and so after the gelatine has dissolved completely, degasification has to be carried out in a degasifying apparatus in order to obtain a bubble-free end product. The degased gelatine solution with a water content of between 70 and 75% is sterilized and poured in the hot state out of a pouring vat with a doctor blade onto a cooled roll. The gelatine cools down on the roll and solidifies to a jelly which is drawn as endless, broad band off the cooling roll and then cut into endless strips in a cutting apparatus. The strips are then placed on an endless net and inserted in a dryer with a length of over 100 m. To dry 110 kg of gelatine in the dryer, 35 to 40 million liters of air have to be circulated, and the air has to be dehumidified and sterilized beforehand. Such large quantities of air are required because the drying air may only be heated to under the melting point of the gelatine. After leaving the dryer, the gelatine strips are cut into sheets which are then packed or stored loose. The sheet gelatine leaves the dryer with a final moisture of 10.5 to 11.5%.

With this involved dissolving, solidifying and drying process, the gelatine suffers a considerable loss of gelatinous strength, namely approximately 20 to 25 bloom grams, which means an approximately 10% loss of quality.

The process described hereinabove involves an extremely large number of staff. For an hourly capacity of 110 kg of sheet gelatine, 6 to 7 operators are required. In particular, the packing of the sheet gelatine sheets has to be carried out by hand. It has so far not been possible to use counting machines and automatic packing machines for this purpose, more specifically, for the following reason: Shrinking effects occur during the drying of the sheet gelatine. The sheets tend to roll and, therefore, have to be placed on netting in such a way that they adhere slightly to it. This produces a netting impression on the sheet gelatine. All this unavoidably results in an undulating sheet surface and, in particular, the undulations in the edge regions of the sheets are particularly prominant owing to the particularly strong shrinkage. Owing to these unevennesses on the surface of the sheet, in particular at the edge of the sheet, the sheets become intertwined during singling-out and can, therefore, not be handled by automatic machines. Furthermore, the reject quotas during the final checking of the packages are very high.

SUMMARY OF THE INVENTION

The object of the invention is to dispense with the deficiencies set forth hereinabove and to disclose a new process for making gelatine films, in particular sheet gelatine, which is considerably simplified in comparison with the known process and, in particular, results in uniform, smooth end products which can be further processed and, in particular, also packed, automatically.

The object is accomplished in accordance with the invention by plasticizing a powdered gelatine used as starting product with the addition of less than 40% by weight of water in relation to the total mass by the application of shearing forces at an elevated pressure and an elevated temperature, pressing the plastic mass in the form of a film through a slotted die, drawing the film off the slotted die under tension and drying the taut film.

The film can then be easily cut into sheets which are of a smooth, uniform quality and so they can be further processed, in particular, packed without any disturbances also by automatic machines.

BRIEF DESCRIPTION OF THE DRAWING

The drawing is a block diagram illustrating the process of making gelatin sheets from powdered gelatin.

DESCRIPTION OF THE PREFERRED EMBODIMENT

The following description of the preferred embodiments serves in conjunction with several embodiment examples and the appended block diagram to explain the invention in further detail.

In accordance with the inventive process, gelatine film, in particular in the form of sheet gelatine, is produced as follows and automatically packed:

Powdered gelatine with a water content of 8 to 12% as is customary in the trade is conveyed from a storage tank at a constant conveying rate with respect to time into an extruder, preferably a twin-screw extruder with screws rotating in the same direction. In a zone adjacent to the feeding of the powdered gelatine, water is added via a metering pump, more particularly, in an amount of between 3 and 40% by weight in relation to the total mass. The added amount of water is thus considerably less than in the known process (70 to 75% by weight). Preferred metered additions are 5 to 30 or also 10 to 25% by weight.

Further zones which are heated adjoin the feed zones of the extruder for powdered gelatine and water in a known manner. Temperatures of from 50° up to 120° C. are, for example, suitable, with the indicated final temperature being respectively measured at the extruder outlet. A temperature profile with increasing and decreasing temperatures can, however, also be produced at the extruder.

The gelatine mass is plasticized by cooperation of the temperature, the shearing forces produced in the extruder (in dependence upon the screw configuration and the rotational speed) and the pressures prevailing in the extruder.

The pressures occurring in the extruder can be up to 250 bar. They preferably lie between 5 and 200, in particular between 10 and 150 bar. The temperatures occurring during the plasticizing can be up to 200° C. They preferably lie between 40° and 160° C., in particular between 80° and 130° C. The indicated pressure values were respectively measured at the extruder outlet.

A preferably heatable flat-film die, known per se, in the form of a slotted die preferably with an adjustable slot height is arranged at the outlet of the extruder. A flat band is extruded under pressure through this die. The band width can be selected almost optionally up to approximately 2 m. Film thicknesses in the range of 0.01 to 3 mm can be obtained by adjustment of the slotted die. Preferred values lie between 0.05 and 0.5 mm. Slices can be made from thick films; the thin films are primarily suited for the production of sheet gelatine.

The band of gelatine emerging from the slotted nozzle is then drawn off under tension, for example, over heatable or coolable rolls and guided over a short drying section. In this short drying section, the water required for the plasticizing is removed again. The required dryer can be chosen very small in comparison with that of the known process because the drying of the plasticized gelatine bands is very simple: the amount of water to be removed is relatively small. The melting point of plasticized gelatine is very high and so one can work with a drying air temperature of over 100° C. The plasticized mass leaves the extruder at temperatures of approximately 100° C. as gelling is dispensed with. The thin, flexible gelatine film does not have to be fixed on a drying net but instead can be guided over deflection rolls. Therefore, drying on an extremely small area is possible because the latter can be used three-dimensionally. The warm air can be applied to both sides of the advancing gelatine film. There is also no warping or undulating of the film as a result of uneven shrinkage, particularly since the gelatine band does not adhere to a net.

At the outlet of the drying section, the gelatine film is cut to sheet size (for example, 70×230 mm). The cutting is preferably carried out immediately after the dryer as the gelatine film is to a certain extent still plastic there.

The finished sheets can then be packed with conventional automatic packing machines as the thus obtained sheet gelatine sheets are uniformly even and smooth and, in particular, do not exhibit any undulating edge sections. Owing to this excellent structure, the gelatine film can also be packed as rolled goods. A band packed as rolled goods can be perforated crosswise and thereby provided with predetermined breaking points for subsequent division into sheets. In the still plastic state of the gelatine film, impressions, for example, type or weight data, can also be applied without any problems.

The apparatus required for the production of gelatine films described hereinabove (extruder, draw-off rolls, cutters, counters, packing machines, possibly also calenders) are known from other branches of the plastics or food industry and can be readily employed for the production of sheet gelatine, too. These apparatuses operate substantially automatically and require essentially no operation.

The production process described hereinabove, therefore, results in a considerable saving of staff and production space. Moreover, the thus obtained sheet gelatine exhibits practically no loss of gelling strength (bloom); according to past experience, this loss is at least substantially less than with the known production process.

Following the plasticizing procedure, the production of gelatine films described hereinabove can—essentially with the same extruder—also be carried out in the form of a film-blowing process using an annular die known per se which produces a tubular film which is biaxially stretched by the blowing procedure.

A gelatine film produced by means of a flat-film die can be guided in the usual way over calender rolls, whereby the thickness of the sheet gelatine (later cut into sheets of gelatine) can be adjusted to desired values. The calender could also be cooled and in this way replace a cooling roll.

During the drawing-off from the slotted die under tension, the gelatine film can also be stretched and reduced in its thickness with apparatus (roller frame) known per se. During the blowing of a tubular film, such stretching and reducing in thickness occur anyhow.

Prior to the pressing-out through the slotted die, additives can be added to the gelatine mass to be plasticized in the extruder, in particular pectin, alginate, starch, other vegetable hydrocolloids, taste and/or aromatic substances, coloring matters and/or softeners, with, in particular, glycerine, sorbit or ethylene glycol being suitable as softeners. Further additives are: fats, oils, other vegetable and animal proteins, inorganic additives and/or cellulose products including wood flour.

EXAMPLE 1

Commercially available powdered gelatine with the following physical data:

| bloom | viscosity | color | clarity | ph-value | moisture |
| --- | --- | --- | --- | --- | --- |
| 248 g | 87 mP | 16 | 005 | 5.1 | 9.7% | was metered in an amount of 5 kg/h into a twin-screw extruder with screws rotating in the same direction. At a further metering point, 0.55 kg/h of cold water was pumped in. Hence together with the original moisture of the powdered gelatine the total water content is 19.7% by weight. The ten heat zones of the extruder were tempered between 50° and 110° C., more particularly, rising to 110° C. and then dropping again to 90° C. at the extruder outlet. The pressure measured at the extruder outlet was 40 bar. The mass was plasticized using shearing force, temperature and pressure in the extruder and extruded via a heatable flat-film die with a slot width of 140 mm as 0.08 mm thick endless band. The extruded band was drawn off the die under tension by a chill roll system, dried and cooled down to approximately room temperature. In the still plastic state, the endless band was cut into individual sheets 80×228 mm after the drying and then packed; 600 sheets had a weight of approximately 1 kg.

Analysis of the thus produced sheet gelatine showed:

| bloom | viscosity | color | clarity | ph-value | water content |
| --- | --- | --- | --- | --- | --- |
| 235 g | 87 | 17 | 005 | 5.1 | 10.3% |

EXAMPLE 2

Powdered gelatine with a gelling strength of 182 bloom and a water content of 10.7% was metered into the extruder and plasticized, as described in Example 1. The metered amount of gelatine was 6.85 kg/h, that of water 0.95 kg/h, which resulted in a total water content of 22.7% by weight. With a pressure of 32 bar, a band 140 mm width was extruded via a die with a broad slot and a die slot height of 0.12 mm. The band was drawn off via a chill roll system and dried. The rolls of the chill roll system were heated up to 40° C. In the still plastic state, the band was cut into gelatine sheets with the dimensions 80×228 mm.

The gelatine had a gelling strength of 168 bloom and a residual water content of 11.9% by weight. It, therefore, corresponded to the usual quality 400.

EXAMPLE 3

Powdered gelatine was metered into the extruder in an amount of 4.7 kg/h as in Example 2. 0.93 kg/h of cold water was added (total water content approximately 26% by weight). The plastification took place at 115° C. The plasticized mass was extruded via a film-blowing head having a die with an annular slot. The material was so flexible that variation of the amount of supporting air enabled almost optional blowing-up of the extruded tube and hence variation of the film thickness within far-reaching limits, for example, up to 0.01 mm. The films were cut into endless strips in the still plastic state and subsequently dried in a stream of hot air.

EXAMPLE 4

Powdered gelatine of the following quality:

| bloom | viscosity | color | clarity | ph-value | water content |
| --- | --- | --- | --- | --- | --- |
| 112 g | 51 | 38 | 010 | 6.4 | 11.7% | was introduced in an amount of 6.0 kg/h into an extruder with twin screws running in the same direction. Cold water was metered in an amount of 0.5 kg/h (total water content 19.4% by weight) into an adjacent zone of the extruder. The plastification took place at temperatures increasing from extruder zone to extruder zone between 50° and 100° C. The mass pressure (measured at the extruder outlet) was 65 bar. The plasticized mass was extruded through a die with a broad slot of 140 mm width and 0.24 mm height. The resulting band was drawn off under tension with a chill roll system. The excess water was then removed in a stream of hot air (approximately 110° C.) and so a residual water content of 12% by weight remained. In the still plastic state, the band was cut into sheets with the dimensions 80×228 mm. Sheet gelatine with a bloom value of 105 g was obtained.

EXAMPLE 5

The procedure is as described in Example 4. For the extrusion, however, the height of the die slot is adjusted to 0.5 mm. Hence the mass pressure is lower than in Example 4. The plastic gelatine band is calibrated via a calender with three rolls to a band thickness of 0.23 mm. After the cutting, sheet gelatine of the same quality is obtained.

EXAMPLE 6

Plastification and extrusion are carried out as described in Example 1. In addition, red food coloring matter is metered into the fourth zone of the extruder in an amount of 25 g/h. Red sheet gelatine of good quality suitable, for example, for cake icing is obtained.

EXAMPLE 7

The procedure is as in Example 5. After the cutting, a designation is impressed with a heated stamp on the amorphous gelatine mass in the still plastic state.

EXAMPLE 8

Plastification and extrusion are carried out as described in Example 1. However, the height of the die slot is 0.2 mm. For drawing off the band under tension, a calender is used which reduces the thickness of the band to 0.152 mm. In the still plastic state, gelatine sheets with a piece size of 100×50 mm are punched out of the band. The sheets have a weight of 1 g/piece (density of the gelatine = 1.32 g/cm$^3$).

EXAMPLE 9

The powdered gelatine used in Example 1 was extruded and calibrated in accordance with Example 4. However, the total water content was 26% by weight. The band thickness was reduced to approximately 0.42 mm by a calender. The endless band was cut in the still plastic state to a width of 30 mm. Gelatine sheets with a piece size of 100×30 mm were then punched out of the band.

EXAMPLE 10

470 kg/h pharmaceutical gelatine in accordance with the German Book of Pharmaceutical Preparations, 9th edition, were extruded, as described in Example 3, in the form of a blown film, the film thickness of which was 0.01 mm. Distilled water was pumped in an amount of 0.4 kg/h into zone 1 of the extruder. Glycerine of pharmaceutical quality was metered in an amount of 0.5 kg/h into zone 4 of the extruder. The extruded film was perforated in the still plastic state. The thus obtained film pieces are suited as haemostatic, absorbable cover for wounds.

The individual steps of the inventive process are set forth again clearly in the block diagram shown in the drawing. The starting materials gelatine 1, water 2 and additives 3 are introduced into an extruder 4 at a suitable point. The gelatine film emerging from the slotted die of the extruder is tensioned over the rolls 5 of a chill roll system or calender and optionally stretched and reduced in its thickness. The thus treated film passes through a dryer section 6 and is then cut into individual sheet gelatine sheets in a cutting apparatus 7. Automatic packing of the gelatine sheets is carried out at a packing station 8. The packed sheet gelatine finally arrives at a despatch station 9.

We claim:

1. Process for making sheet gelatine from powdered gelatine, wherein the powdered gelatine with the addition of 5 to 40% by weight of water in relation to the total mass is plasticized by the application of shearing forces at an elevated pressure of 5 to 250 bar and an elevated temperature of 40° to 200° C., the plasticized mass is pressed in the form of a film through a slotted die, the film is drawn off the slotted die under tension to produce a taut film, the taut film is dried to produce a finished film and the film is cut into single sheets of sheet gelatine.

2. Process as defined in claim 1, wherein between 5 and 30% by weight of water is added.

3. Process as defined in claim 1, wherein between 10 and 25% by weight of water is added.

4. Process as defined in claim 1, wherein the plasticizing is carried out at an elevated pressure of 5 to 200 bar.

5. Process as defined in claim 1, wherein the plasticizing is carried out at an elevated pressure of 10 to 150 bar.

6. Process as defined in claim 1, wherein the plasticizing is carried out at an elevated temperature of from 40° to 160° C.

7. Process as defined in claim 1, wherein the plasticizing is carried out at an elevated temperature of 80° to 130° C.

8. Process as defined in claim 1, wherein the film is pressed out of the slotted die with a thickness of between 0.01 and 3 mm.

9. Process as defined in claim 1, wherein the film is pressed out of the slotted die with a thickness of between 0.05 and 0.5 mm.

10. Process as defined in claim 1, wherein the film is stretched and thereby reduced in its thickness while being drawn off the slotted die.

11. Process as defined in claim 1, wherein the film is pressed in tubular configuration through a die with an annular slot and stretched by blowing.

12. Process as defined in claim 1, wherein the film is adjusted to a certain thickness by calendering.

13. Process as defined in claim 1, wherein the taut film is dried in an air current.

14. Process as defined in claim 1, wherein the finished film is cooled.

15. Process as defined in claim 1, wherein additives are added to the mass before it is pressed out through the slotted die.

16. Process as defined in claim 15, wherein pectin, alginate, starch, coloring matters, softeners, fats, oils, inorganic additives or wood flour are added as additives.

17. Process as defined in claim 16, wherein a softener selected from the group consisting of glycerine, sorbit and ethylene glycol is added.

* * * * *